US007290120B2

(12) United States Patent  (10) Patent No.: US 7,290,120 B2
DiGregorio  (45) Date of Patent: Oct. 30, 2007

(54) MICROPROCESSOR HAVING A POWER-SAVING FETCH AND DECODING UNIT FOR FETCHING AND DECODING COMPRESSED PROGRAM INSTRUCTIONS AND HAVING A PROGRAM INSTRUCTION SEQUENCER

(75) Inventor: Lorenzo DiGregorio, Eching (DE)

(73) Assignee: Infineon Technologies AG, Munich (DE)

( * ) Notice: Subject to any disclaimer, the term of this patent is extended or adjusted under 35 U.S.C. 154(b) by 349 days.

(21) Appl. No.: 11/036,740

(22) Filed: Jan. 14, 2005

(65) Prior Publication Data

US 2005/0172100 A1  Aug. 4, 2005

(30) Foreign Application Priority Data

Jan. 29, 2004  (DE) ...................... 10 2004 004 561

(51) Int. Cl.
*G06F 9/30* (2006.01)
*G06F 1/26* (2006.01)

(52) U.S. Cl. ..................... 712/210; 712/211; 712/24; 713/320

(58) Field of Classification Search ................ 712/210, 712/24, 215, 214, 209, 21, 211; 713/320
See application file for complete search history.

(56) References Cited

U.S. PATENT DOCUMENTS 6,209,079 B1  3/2001  Otani et al.
2002/0069345 A1*  6/2002  Mohamed et al. .......... 712/215
2003/0061473 A1*  3/2003  Revilla et al. .............. 712/245

* cited by examiner

*Primary Examiner*—Hong Kim
(74) *Attorney, Agent, or Firm*—Jenkins, Wilson, Taylor & Hunt, P.A.

(57) ABSTRACT

A microprocessor having a power-saving fetch and decoding unit for fetching and decoding compressed program instructions and having a program instruction sequencer is disclosed. The microprocessor based on the inventive architecture has a power-saving fetch and decoding unit for fetching and decoding program instructions. The fetch and decoding unit has a program instruction memory which receives a sequential program instruction address addressing the next program instruction memory line which is to be read, having at least one program instruction memory line which can store an indicator flag, a long program instruction index, a short program instruction and a first source register address. A directory memory receives the long program instruction index (6) addressing the next directory memory line which is to be read. A short program instruction decoding unit for decoding the short program instruction which has been read from the program instruction memory and for providing a first program instruction counter.

28 Claims, 8 Drawing Sheets

|  | T1 | T2 | T3 | T4 | T5 |
|---|---|---|---|---|---|
| PB-1: | PBIS | VS | PDE | SPRE |  |
| PB-2: |  | PBIS | VS | PDE | SPRE |
| PB-3: |  |  | PBIS | VS | PDE |
| PB-4: |  |  |  | PBIS | VS |

(Invention)

(Invention)

(Invention)

(Invention)

FIG 11
(Invention)

|         | T1 | T2 | T3 | T4 | T5 |
|---------|----|----|----|----|----|
| KPB-1:  | 4  | 14 | 3  |    |    |
| LPB-2:  |    | 4  | 10 | 15 | 3  |
| KPB-3:  |    |    | 4  | 14 |    |
| KPB-4:  |    |    |    | 4  |    |

MICROPROCESSOR HAVING A POWER-SAVING FETCH AND DECODING UNIT FOR FETCHING AND DECODING COMPRESSED PROGRAM INSTRUCTIONS AND HAVING A PROGRAM INSTRUCTION SEQUENCER

TECHNICAL FIELD

The invention relates to a microprocessor having a power-saving fetch and decoding unit for fetching and decoding compressed program instructions which are processed using a standard processor root unit in the microprocessor, and having a program instruction sequencer.

BACKGROUND ART

The microprocessor based on the inventive architecture is designed such that the microprocessor has a power-saving fetch and decoding unit for fetching and decoding compressed program instructions. The fetch and decoding unit has a program instruction memory which receives a sequential program instruction address addressing the next program instruction memory line which is to be read, having at least one program instruction memory line which can store an indicator flag, a long program instruction index, a short program instruction and a first source register address. In addition, the fetch and decoding unit has a directory memory for long program instructions which receives the long program instruction index addressing the next directory memory line which is to be read, having at least one directory memory line which can store a long program instruction and a second source register address. The fetch and decoding unit also has a short program instruction decoding unit for decoding the short program instruction which has been read from the program instruction memory and for providing a first program instruction counter, and a long program instruction decoding unit for decoding the long program instruction which has been read from the directory memory and for providing a second program instruction counter. In addition, the microprocessor has a program instruction sequencer which generates the sequential program instruction address on the basis of the first program instruction counter and the second program instruction counter.

An ordinary microprocessor program is the cause of most access operations to the program instruction memory. The frequent memory access means that the program instruction fetch unit in the microprocessor is the largest consumer of power within the microprocessor. The power consumption of the program instruction fetch unit may be up to one third of the total power consumption of the microprocessor. Reducing the program instruction memory also means reducing the total power consumption of a microprocessor. Besides the integration stage of a microprocessor, its power consumption is a fundamental aspect in the development of a microprocessor architecture.

FIG. 1 shows a conventional program instruction memory PBS based on the prior art. The program instruction memory PBS has at least one program instruction memory line PBSZ. In the example shown in FIG. 1, the program instruction memory PBS has seven program instruction memory lines PBSZ which are each addressed by a sequential program instruction address PBA (PBA-1 to PBA-7), with each program instruction memory line PBSZ storing a program instruction PB (PB-1, PB-2, PB-3) in an orderly sequence with respect to the loaded microprocessor program.

A program instruction memory line PBSZ has v bits, for example v=32 bits, v=128 bits etc.

The program instruction sequence of the microprocessor program stored in the program instruction memory PBS is as follows:

| | |
|---|---|
| 1st PBSZ | PB1 |
| 2nd PBSZ | PB2 |
| 3rd PBSZ | PB2 |
| 4th PBSZ | PB3 |
| 5th PBSZ | PB1 |
| 6th PBSZ | PB3 |
| 7th PBSZ | PB2 |

The stored microprocessor program comprises a sequence of seven program instructions, with only three different program instructions (PB1, PB2, PB3) arising within the microprocessor program.

FIG. 2 shows, on the basis of the prior art, a possible way of reducing the memory space requirement of a microprocessor program which does not exclusively comprise different program instructions (and accordingly has a certain level of redundancy for program instructions which arise). This is done by using data compression of the microprocessor program, for example on the basis of the Huffman code, known from source coding.

For every program instruction (PB-1, PB-2, PB-3) which arises in the microprocessor program, a program instruction index PBI is generated, the program instruction index PBI being a compressed code word associated with the program instruction PB.

The program instruction index PBI has w bits, with w being significantly less than v (w<<v).

Instead of the program instruction memory PBS from FIG. 1, FIG. 2 provides a program instruction index memory PBIS and a directory memory VS.

The directory memory VS is used to store the program instructions which arise in the microprocessor program in a respective directory memory line VSZ. Accordingly, the directory memory VS in the example from FIG. 2 has three directory memory lines VSZ.

The program instruction index memory PBIS has stored the orderly sequence of the microprocessor program (cf. FIG. 1) in orderly fashion using the program instruction indices PBI.

The sequential program instruction addresses PBA from FIG. 1 and FIG. 2 correspond to one another.

If the sequential program instruction address PBA-1 points to the first program instruction index memory line PBISZ, the program instruction index PBI-1 is read, which points to the program instruction PB-1 in the directory memory VS. The program instruction index PBI-1 is subsequently read from the program instruction index memory PBIS using the fifth sequential program instruction address PBA-5. The program instruction index PBI-1 which has been read from the fifth program instruction index memory line PBIS also points to the first directory memory line VSZ, which stores the program instruction PB-1.

Storing the microprocessor program shown in FIG. 1 requires 7 (number of program instruction lines) times v bits (word length of the program instruction). If the word length of the program instruction is v=32 bits, for example, then storing the microprocessor program shown in FIG. 1 requires: 7*32 bits=224 bits.

If the same microprocessor program shown in FIG. 2 is stored using the program instruction index memory BPIS and the directory memory VS, then 7 (number of program instruction lines) times w bits (let w=4 bits, for example) are required in order to store the program instruction indices PBI in the program instruction index memory PBIS. To store the three different program instructions PB1, PB2, PB3 in the directory memory VS, 3 (number of different program instructions PB) times v (word length of the program instruction) are required. Storage of the microprocessor program requires a total of: 7*4 bits+3*32 bits=124 bits.

By compressing the program instructions into program instruction indices PBI and by splitting the program instruction memory PBS into a directory memory VS and a program index memory PBIS, 100 bits of memory space requirement is saved in the example shown above.

FIG. 3 shows a known microprocessor based on a pipeline architecture.

The splitting of the program instruction memory PBS into a directory memory VS and a program instruction index memory PBIS as proposed in FIG. 2 is used in the known microprocessor MP shown in FIG. 3.

The microprocessor MP has a fetch and decoding unit HDE for fetching and decoding program instructions.

The fetch and decoding unit HDE has a program fetch unit PHE and a program instruction decoding unit PDE.

The program instruction fetch unit PHE has a program instruction index memory PBIS and a directory memory VS (functionality shown in FIG. 2).

As FIG. 2 shows, the program instruction index memory PBIS in the program instruction fetch unit PHE receives from the standard processor root unit SPRE in the microprocessor MP the next sequential program instruction address PBA which is to be read.

The received sequential program instruction address PBA addresses a program instruction index memory line PBISZ which stores the program instruction index PBI which is to be read.

The program instruction index PBI which has been read is transferred to the directory memory VS.

The directory memory VS reads the program instruction PB addressed using the received program instruction index PBI and transfers the program instruction PB to the program instruction decoding unit PDE in the fetch and decoding unit HDE in the microprocessor MP. Optionally, a first source register address 1st QRA and a second source register address 2nd QRA are stored in the directory memory VS in association with the program instruction PB in addition to the program instruction PB.

The additional first source register address 1st QRA associated with the program instruction and the additional associated second source register address 2nd QRA are transferred to the register bank RB which are provided in the microprocessor MP.

In the same clock cycle, the program instruction decoding unit PDE decodes the received program instruction PB, and the register bank RB provides the first register value 1st RW, addressed using the first source register address 1st QRA, and the second register value 2nd RW, addressed using the second source register address 2nd QRA, and transfers them to the standard processor root unit SPRE on a clock-cycle-sensitive basis. Similarly, the program instruction decoding unit PDE transfers the decoded program instruction PB to the standard processor root unit SPRE.

The standard processor root unit SPRE has an operand fetch unit OHE for fetching operands in the received decoded program instruction PB, a program instruction execution unit PAE for executing the received decoded program instruction PB, and a write-back unit ZSE for writing back operation results or write-back values ZSW.

The write-back unit ZSE writes the write-back values ZSW to the register bank RB.

The program instruction executed by the program instruction execution unit PAE results in the generation of a sequential program instruction address PBA for the next program instruction PB which is to be read, and this sequential program instruction address PBA is transferred to the program instruction index memory PBIS for the purpose of reading the next program instruction index PBI.

FIG. 4 shows a pipeline diagram of the known microprocessor based on the pipeline architecture.

The known microprocessor based on the pipeline architecture processes the program instructions PB according to the following sequence: the program instruction PB-1 is processed by the microprocessor MP by reading the program instruction index PBI, which is associated with the program instruction PB-1, from the program instruction index memory PBIS in clock cycle T1.

In clock cycle T2, the directory memory VS receives the program instruction index PBI associated with the program instruction PB-1 and provides the program instruction PB-1 in accordance with FIG. 2.

In clock cycle T3, the program instruction PB-1 is received by the program instruction decoding unit PDE and the received program instruction PB-1 is decoded. In addition, the decoded program instruction PB-1 is provided.

In clock cycle T4, the decoded program instruction PB-1 is received by the standard processor root unit SPRE and is processed further in accordance with the prior art.

Following the pipeline diagram shown in FIG. 4, the program instruction PB-2 is in the instruction decoding unit PDE during clock cycle T4, the program instruction PB-3 is in the directory memory VS and the program instruction PB-4 is in the program instruction index memory PBIS.

FIGS. 2 to 4 show a known microprocessor architecture which takes advantage of the data compression of a microprocessor program.

For every program instruction, there is an index within this architecture. If a program instruction occurs in a microprocessor program only rarely or even just once, then this architecture is not suitable, since the higher level of complexity of the architecture in FIGS. 2 to 4 over an architecture without data compression on account of the added pipeline stage in the directory memory VS would not be justified.

A further drawback of the prior art is that particularly skip instructions (branches) cause high latencies. If the program instruction PB-1 is a skip instruction of this type, for example, then the three instructions PB-2, PB-3 and PB-4 have been loaded into the pipeline of the microprocessor MP. The pipeline of the microprocessor MP needs to be cleared of the program instructions PB-2, PB-3 and PB-4.

In accordance with the microprocessor architecture based on the prior art shown above, a skip instruction causes a latency of three clock cycles for the pipeline of the microprocessor MP. In the case of microprocessor programs with low redundancy, an additional pipeline stage is not justified, however, as in the prior art shown above.

FIG. 5 shows a known program instruction index memory PBIS for the extended storage of program instruction indices PBI and short program instructions K.

FIG. 5 shows a further development of the prior art shown in FIGS. 2 to 4, since besides the program instruction indices PBI a program instruction index memory line PBISZ in the program instruction index memory PBIS can also store short instructions K.

It is appropriate for short instructions K which arise only rarely in the microprocessor program not to be indexed using a program instruction index PBI.

FIG. 5 shows the known program instruction index storage with extended storage of program instruction indices PBI and short program instructions K, the program instruction index memory PBIS having at least one program instruction index memory line PBISZ. A program instruction index memory line PBISZ has x bits.

One bit of the x bits in the program instruction index memory line PBISZ is used to store an indicator flag AF.

The indicator flag AF has the function of specifying whether the corresponding program instruction index memory line PBISZ stores a short instruction K or a program instruction index PBI.

In accordance with the present example shown in FIG. 5, a program instruction index memory line PBISZ stores a short instruction K if the indicator flag AF has been set to zero.

By contrast, a program instruction index memory line PBISZ stores a program instruction index PBI if the indicator flag AF has been set to one.

The remaining x-1 bits of a program instruction index memory line PBISZ are used to store a program instruction index PBI or to store a short instruction K. This produces a definition of a short instruction K. A short instruction K is a program instruction PB which has no more than a number of x-1 bits.

Accordingly, all program instructions which have at least x bits are "long program instructions" L and accordingly need to be indexed using a program instruction index PBI.

FIG. 6 shows a known microprocessor MP which uses the known program instruction index memory PBIS for the extended storage of program instruction indices PBI and short program instructions K.

The microprocessor MP shown in FIG. 6 has a fetch and decoding unit HDE.

The fetch and decoding unit HDE has the program instruction index memory PBIS, the directory memory VS, a first delay element 1st VG, a second delay element 2nd VG, a first multiplexer 1st MUX, a second multiplexer 2nd MUX and a program instruction decoding unit PDE.

The microprocessor MP also has a standard processor root unit SPRE which provides a sequential program instruction address PBA for the next program instruction which is to be read in the fetch and decoding unit HDE.

The program instruction index memory PBIS in the fetch and decoding unit HDE receives the sequential program instruction address PBA of the next program instruction PB which is to be read.

As FIG. 5 shows, that program instruction index memory line PBISZ in the program instruction index memory PBIS which corresponds to the sequential program instruction address PBA is read.

If the indicator flag AF in the program instruction index memory line PBISZ which is to be read has been set to one, then the program instruction index memory line PBISZ which is to be read stores a program instruction index which addresses a long program instruction L which is stored in the directory memory VS. The program instruction index PBI which has been read is transferred to the directory memory VS (cf. FIG. 5).

The directory memory VS ascertains the long instruction L corresponding to the program instruction index PBI and transfers it to the first multiplexer 1st MUX and to the second multiplexer 2nd MUX.

If the indicator flag AF in the corresponding program instruction index memory line PBISZ which is to be read has been set to zero, however, the corresponding program instruction index memory line PBISZ stores a short instruction K which is transferred from the program instruction index memory PBIS to the first delay element 1st VG.

The first delay element 1st VG delays the short program instruction K received by one clock cycle T and transfers the delayed short program instruction K to the first multiplexer 1st MUX and to the second multiplexer 2nd MUX.

The indicator flag AF in the respective program instruction index memory line which is to be read in the program index memory PBS is transferred to the second delay element 2nd VG.

The second delay element 2nd VG delays the received indicator flag AF by one clock cycle T and uses the delayed indicator flag AF to control the multiplexers 1st MUX and 2nd MUX.

The first multiplexer 1st MUX has the function of respectively providing the received program instruction, either the short program instruction K or the long program instruction L, to the program instruction decoding unit PDE on a clock-cycle-sensitive basis.

During the same clock cycle, the second multiplexer 2nd MUX has the function of transferring the first source register address 1st QRA and the second source register address 2nd QRA which are associated with the respective received program instruction, either the short program instruction K or the long program instruction L, to the register bank RB.

Hence, in the same clock cycle, the instruction decoding unit PDE decodes the respective program instruction, either the short program instruction K or the long program instruction L, and the source register addresses associated with the respective program instruction, the first source register address 1st QRA and the second source register address 2nd QRA, are received by the register bank RB, with the first source register address 1st QRA addressing a first register value and the second source register address 2nd QRA addressing a second register value 2nd RW.

On a clock-cycle-sensitive basis, the program instruction decoding unit PDE provides either the decoded short program instruction K or the decoded long program instruction L for the standard processor root unit.

During the same clock cycle, a forwarding device WE which is provided within the microprocessor MP supplies the standard processor root unit SPRE with the associated register values corresponding to the program instruction which is to be transferred to the standard processor unit SPRE from the program instruction decoding unit PDE, the first register value 1st RW and the second register value 2nd RW.

The forwarding unit WE makes the decision about the register values which are to be forwarded on the basis of received register value requests, namely a first register value request 1st RWA, received from the operand fetch unit OHE, a second register value request 2nd RWA, received from the program instruction execution unit PAE, and on the basis of the received register values, the first register value 1st RW and the second register value 2nd RW.

On the basis of the prior art, the standard processor root unit SPRE processes the received program instructions and the associated first register values and second register values 1st RW and 2nd RW using the operand fetch unit OHE, the program instruction execution unit PAE and the write-back unit ZSE.

The standard processor root unit SPRE is prompted by the processed program instructions to generate a sequential program instruction address PBA for the next program instruction which is to be read and provides the sequential program instruction address PBA for the fetch and decoding unit HDE.

A drawback of this prior art is that only short instructions do not need to be indexed without accessing a source register address. Even with short program instructions K, which require a small amount of memory within the program instruction index register PBI and access a source register address, the first source register address 1st QRA, two memory access operations are needed, to the program instruction index memory PBI and to the directory memory VS. Skip instructions cause long latencies.

The aforementioned problems result in a higher level of power consumption by the microprocessor and in a large time involvement on account of the memory access operations which have not been reduced.

In addition, it is not out of the ordinary for a program instruction index memory line PBISZ to be not completely used for storing a program instruction index PBI or a short program instruction K, i.e. for a particular number of the x bits in the program instruction index memory line to remain unused. These unutilized resources are a drawback of the prior art.

SUMMARY OF THE INVENTION

It is therefore an object of the present invention to provide a microprocessor which reduces both the power consumption and latencies.

The invention achieves this object by means of the microprocessor specified in Claim 1 and by means of the method specified in Claim 28.

The idea on which the present invention is based essentially involves the provision of a microprocessor
- having a program instruction memory which receives a sequential program instruction address addressing the next program instruction memory line which is to be read, having at least one program instruction memory line which can store an indicator flag, a long program instruction index, a short program instruction and a first source register address,
- having a directory memory for long program instructions which receives the long program instruction index addressing the next directory memory line which is to be read, having at least one directory memory line which can store a long program instruction and a second source register address,
- having a short program instruction decoding unit for decoding the short program instruction which has been read from the program instruction memory and for providing a first program instruction counter,
- having a long program instruction decoding unit for decoding the long program instruction which has been read from the directory memory and for providing a second program instruction counter, and
- having a program instruction sequencer which generates the sequential program instruction address on the basis of the first program instruction counter and the second program instruction counter.

One advantage of the inventive arrangement is, in particular, that each decoding unit, namely the short program instruction decoding unit and the long program instruction decoding unit, has to decode a smaller number of program instructions, resulting in speed advantages and the prevention of latencies.

A further advantage of the inventive arrangement is that the early provision of the first program instruction counter and of the second program instruction counter, particularly in the case of skip instructions, prevents program instructions from being loaded unnecessarily from the program instruction memory into the microprocessor's pipeline.

Accordingly, time is saved, and latencies in the microprocessor are reduced on account of the presence of two independent decoding units. The saving of time and memory space requirement means that power is also saved and the two independent decoding units can be implemented more easily.

The subclaims contain advantageous developments of the microprocessor having a power-saving fetch and decoding unit and having a program instruction sequencer.

In line with a further preferred development, the microprocessor has a power-saving fetch and decoding unit for fetching program instructions which are processed using a standard processor root unit, where the fetch and decoding unit has a program instruction memory for long program instruction indices and short program instructions, a directory memory for long program instructions, a short program instruction decoding unit and a long program instruction decoding unit.

The program instruction memory for long program instruction indices and short program instructions, which receives a sequential program instruction address, has at least one program instruction memory line, where the sequential program instruction address addresses the next program instruction memory line which is to be read from the program instruction memory, where each program instruction memory line can respectively store either an indicator flag indicating whether the associated program instruction memory line stores a long program instruction index or a short program instruction, a long program instruction index and a first source register address, associated with the long program instruction index, for addressing a first physical register value, or an indicator flag, a short program instruction and a first source register address associated with the short program instruction or an indicator flag and a short program instruction.

The directory memory for long program instructions, which receives the long program instruction index under the control of the indicator flag, has at least one directory memory line, where the received long program instruction index addresses the next directory memory line which is to be read from the directory memory, where each directory memory line can respectively store either a long program instruction or a long program instruction and additionally a second source register address, associated with the long program instruction, for addressing a second physical register value.

The short program instruction decoding unit decodes the short program instruction which has been read from the program instruction memory.

The long program instruction decoding unit decodes the long program instruction which has been read from the directory memory.

One advantage of this preferred development is that it is not always necessary to read a second source register address. This only becomes necessary in the case of long program instructions, which access two source register addresses.

A further advantage of this preferred development is that in the case of the directory memory the word length to be stored is reduced by the word length of the first source register address. This saves memory space requirement, which in turn lowers the power required. In addition, a smaller memory space requirement is easier to implement.

A further advantage of this preferred development is that by pulling out a source register address, namely the first source register address, it is possible to address a plurality of long program instructions using one index. This saves memory space.

In line with a further preferred development, the program instruction memory stores, in coded form, a sequence of program instructions which has been put into order using the sequential program instruction addresses, where a program instruction is either a short program instruction and a first source register address associated with the short program instruction or a short program instruction or a long program instruction and a first source register address associated with the long program instruction or a long program instruction, the first source register address associated with the long program instruction and a second source register address associated with the long program instruction, and where precisely one program instruction memory line of the index memory is read for each clock cycle.

In line with a further preferred development, the program instruction memory line of the index memory has a predetermined number of x bits, where the indicator flag is stored using precisely one bit, and the remaining x-1 bits are used for storing either the long program instruction index and the first source register address associated with the long program instruction index or the short program instruction or the short program instruction and the first source register address associated with the short program instruction.

In line with a further preferred development, the first source register address within the program instruction memory line of the index memory can be stored using precisely y bits, which means that the long program instruction index has precisely x-y-1 bits, which addresses either the long program instruction or the long program instruction and additionally the second source register address associated with the long program instruction.

In line with a further preferred development, the short program instruction is a program instruction which accesses no more than the associated first source register address and has no more than x-1 bits.

In line with one preferred development of the invention, the microprocessor has a register bank which loads precisely one first source register address from the program instruction memory in each clock cycle.

In line with one preferred development, the long program instruction index, if stored in that program instruction memory line of the index memory which is to be read for the corresponding clock cycle, is transferred from the program instruction memory to the directory memory, with the directory memory ascertaining the directory memory line which is associated with the long program instruction index.

In line with a further preferred development, the short program instruction, if stored in that program instruction memory line of the index memory which is to be read for the corresponding clock cycle, is transferred from the program instruction memory to the short program instruction decoding unit, with the register bank loading the first source register address associated with the short program instruction in the same clock cycle.

In line with a further preferred development, the long program instruction addressed using the long program instruction index is transferred from the ascertained directory memory line of the directory memory to the long program instruction decoding unit, with the register bank loading the second source register address associated with the long program instruction in the same clock cycle.

In line with a further preferred development, the indicator flag in each program instruction memory line indicates whether the corresponding program instruction memory line stores either a short program instruction or a long program instruction index.

In line with a further preferred development, a short program instruction is stored in the corresponding program instruction memory line if the indicator flag in the corresponding program instruction memory line has been set to zero.

An advantage of this preferred development is that by checking a single bit, namely the indicator flag, it is possible to check whether the program instruction memory line stores a short program instruction or a long program instruction index.

In line with a further preferred development, a long program instruction index and a first source register address associated with the long program instruction index are stored in the corresponding program instruction memory line if the indicator flag in the corresponding program instruction memory line has been set to one.

An advantage of this preferred development is that by checking a single bit, namely the indicator flag, of the program instruction memory line it is possible to check whether the corresponding program instruction memory line stores a short program instruction or a long program instruction index and a first source register address associated with the long program instruction index.

In line with a further preferred development, the indicator flag controls the directory memory in each clock cycle such that if the long program instruction index is stored in the program instruction memory line which is to be read for the corresponding clock cycle the directory memory evaluates the long program instruction index and the first source register address associated with the long program instruction index as such.

An advantage of this preferred development is that the control using the indicator flag means that the directory memory evaluates only relevant data, and not short program instructions, for example.

In line with a further preferred development, the fetch and decoding unit has a delay element which respectively delays the indicator flag by one clock cycle in order to control the long program instruction decoding unit using the indicator flag delayed by one clock cycle such that the long program instruction decoding unit respectively decodes the long program instruction which has been read from the directory memory on a clock-cycle-sensitive basis.

An advantage of this preferred development is that the use of the delay element compensates for the pipeline stage of the directory memory for long program instructions.

In line with a further preferred development, the standard processor root unit has an operand fetch unit for fetching operands in the decoded program instruction, a program instruction execution unit for executing the decoded program instruction, and a write-back unit for writing back operation results.

In line with a further preferred development, in each clock cycle the register bank provides the first physical register value, which has been addressed by the first source register address, and the second physical register value if the second physical register value has been addressed by the second source register address in the corresponding clock cycle.

In line with a further preferred development, the microprocessor has a forwarding unit which, in each clock cycle, receives register value data, namely the first physical register value and the second physical register value if the second physical register value has been provided by the register bank, from the register bank, a first register value request from the operand fetch unit and a second register value request from the program instruction execution unit, and buffer-stores them.

In line with a further preferred development, the forwarding unit is a logic data processing unit which takes the received register data as a basis for deciding what buffer-stored register values are forwarded to the standard processor root unit as first architectonic register value and as second architectonic register value.

In line with a further preferred development, the microprocessor has the program instruction sequencer, which has program instruction sequencer inputs, namely the first program instruction counter provided by the short program instruction decoding unit, a standard program instruction counter provided by the short program instruction decoding unit, the second program instruction counter provided by the long program instruction decoding unit, optionally at least one third program instruction counter provided by the standard processor root unit, with the program instruction sequencer controlling the program instruction memory using the sequential program instruction address generated from the program instruction sequencer inputs such that that program instruction memory line in the next program instruction to be read which is addressed by the sequential program instruction address is read in the subsequent clock cycle.

An advantage of this preferred development is that the use of the program instruction sequencer avoids latencies which can be caused by skip instructions (branches) in particular.

In line with a further preferred development, the sequential program instruction address is transferred from the program instruction sequencer to the short program instruction decoding unit in order to specify whether and, if positive, what skip in the program instruction address is made within the program instruction memory.

In line with a further preferred development, the first program instruction counter, the second program instruction counter and the third program instruction counter respectively specify a skip destination address for the program instruction memory by activating a skip program instruction (branch). The standard program instruction counter is equivalent to the conventional instruction counter (program counter) based on the prior art.

In line with a further preferred development, the program instruction sequencer prioritizes the second program instruction counter with respect to the first program instruction counter when the sequential program instruction address 33 is generated.

In line with a further preferred development, the program instruction sequencer prioritizes the first program instruction counter and the second program instruction counter with respect to the third program instruction counter and the standard program instruction counter when the sequential program instruction address is generated.

In line with a further preferred development, the program instruction sequencer prioritizes the first program instruction counter and the second program instruction counter with respect to the third program instruction counter, the fourth program instruction counter and the fifth program instruction counter when the sequential program instruction address is generated.

In line with a further preferred development, the standard processor root unit uses a pipeline method for the purpose of sequentially processing the program instructions which are passed to it either by the short instruction decoding unit or by the long instruction decoding unit.

In line with a further preferred development, the standard processor root unit is part of a DSP processor, of a protocol processor or of a universal processor (general purpose processor).

In line with a further preferred development, the program instruction execution unit in the standard processor root unit contains an arithmetic and logic unit (ALU) and/or an address generator unit (AGU).

Exemplary embodiments of the invention are illustrated in the drawings and are explained in more detail in the description below. Identical reference symbols in the figures denote elements which have the same function.

BRIEF DESCRIPTION OF THE DRAWINGS

FIG. 11 shows a pipeline diagram of an inventive microprocessor.

DETAILED DESCRIPTION OF THE INVENTION

Although the present invention is described below with reference to processors or microprocessors or their architectures, it is not limited thereto but rather may be used in a wide variety of ways.

Figure 1:
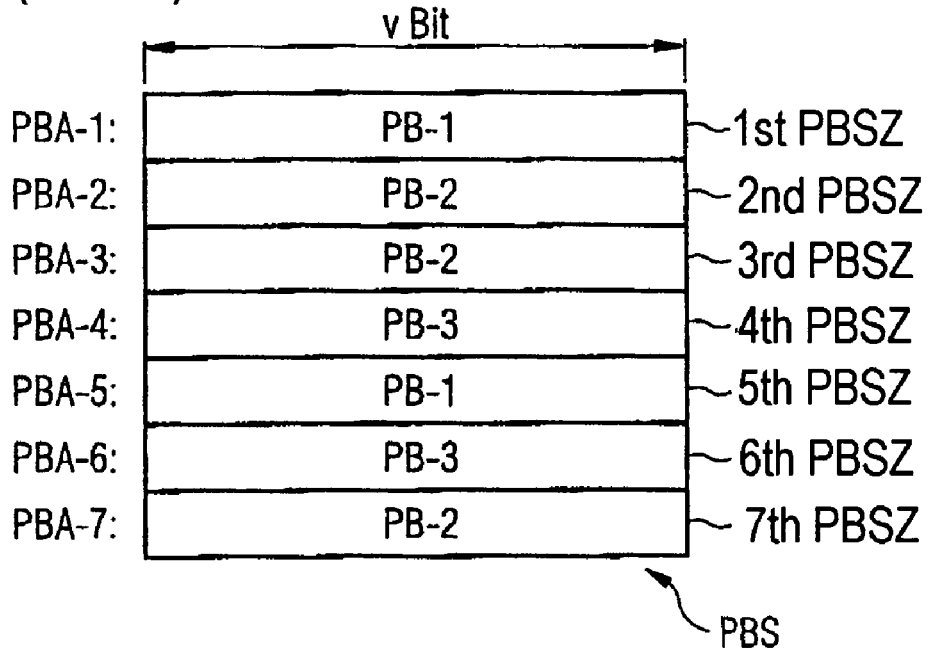
FIG. 1 shows a program instruction memory based on the prior art.
Figure 2:
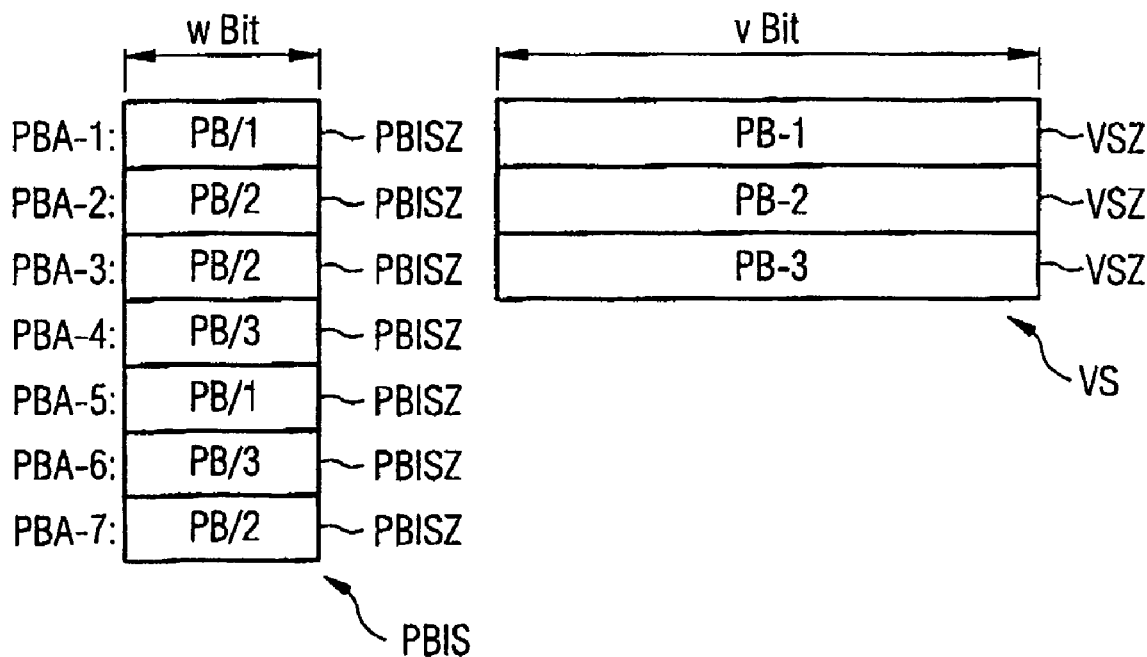
FIG. 2 shows a program instruction index memory and a directory memory based on the prior art.
Figure 3:
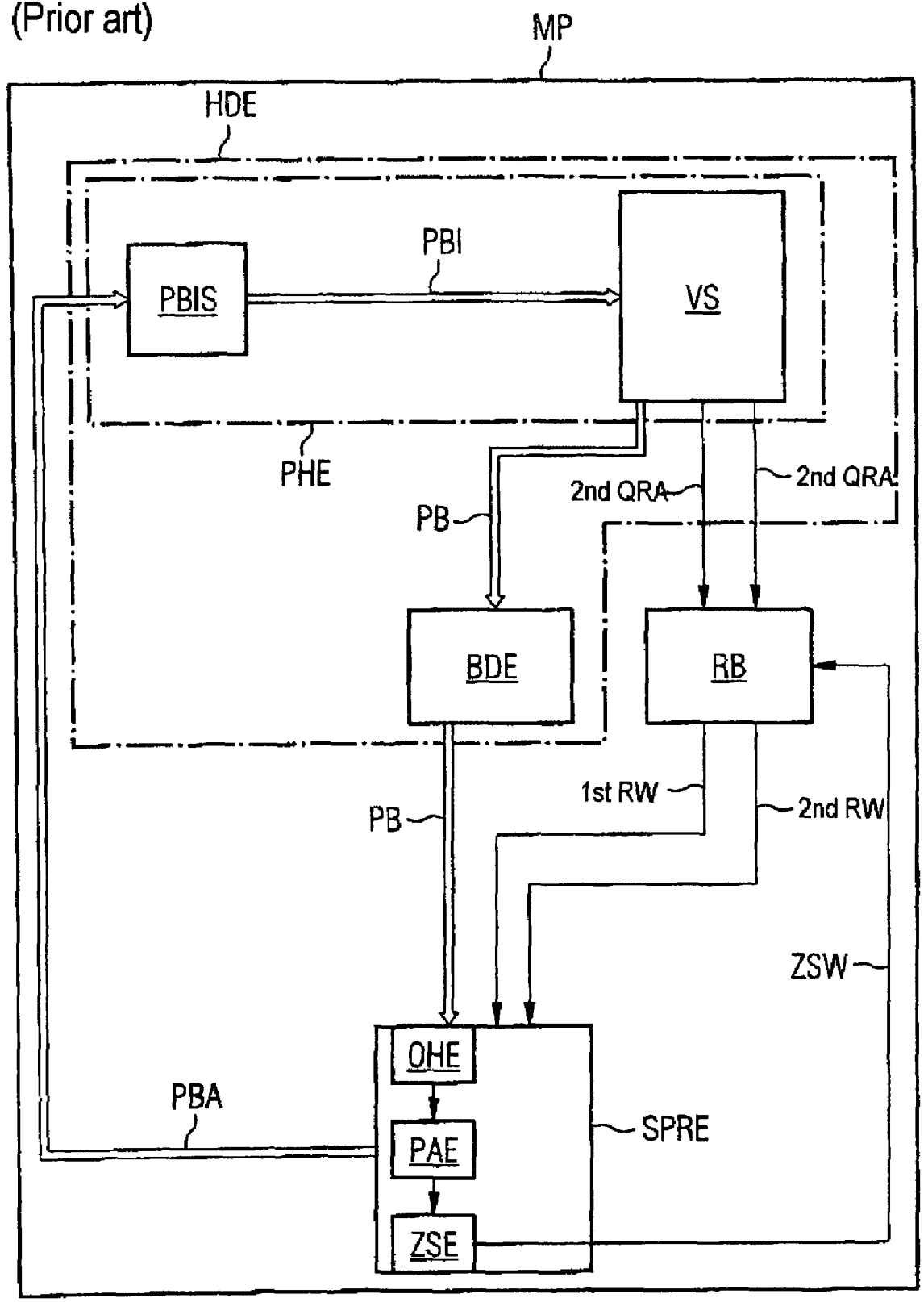
FIG. 3 shows a known microprocessor based on a pipeline architecture.
Figures 4, 5:
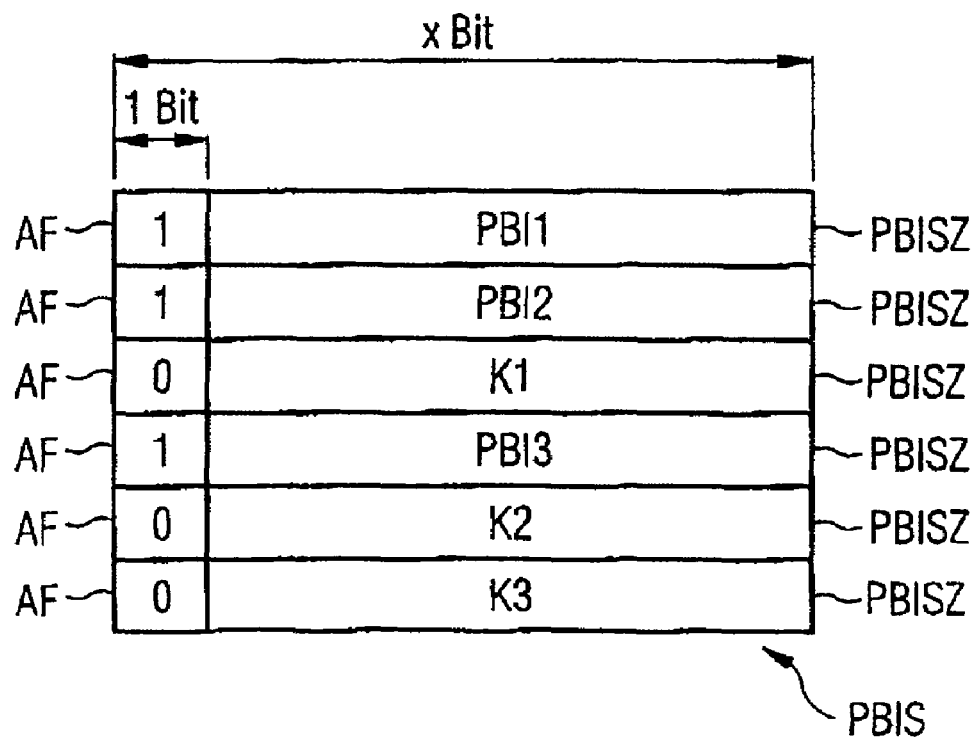
FIG. 4 shows a pipeline diagram of the known microprocessor based on the pipeline architecture.
FIG. 5 shows a known program instruction index memory for the extended storage of program instruction indices and short program instructions.
Figure 6:
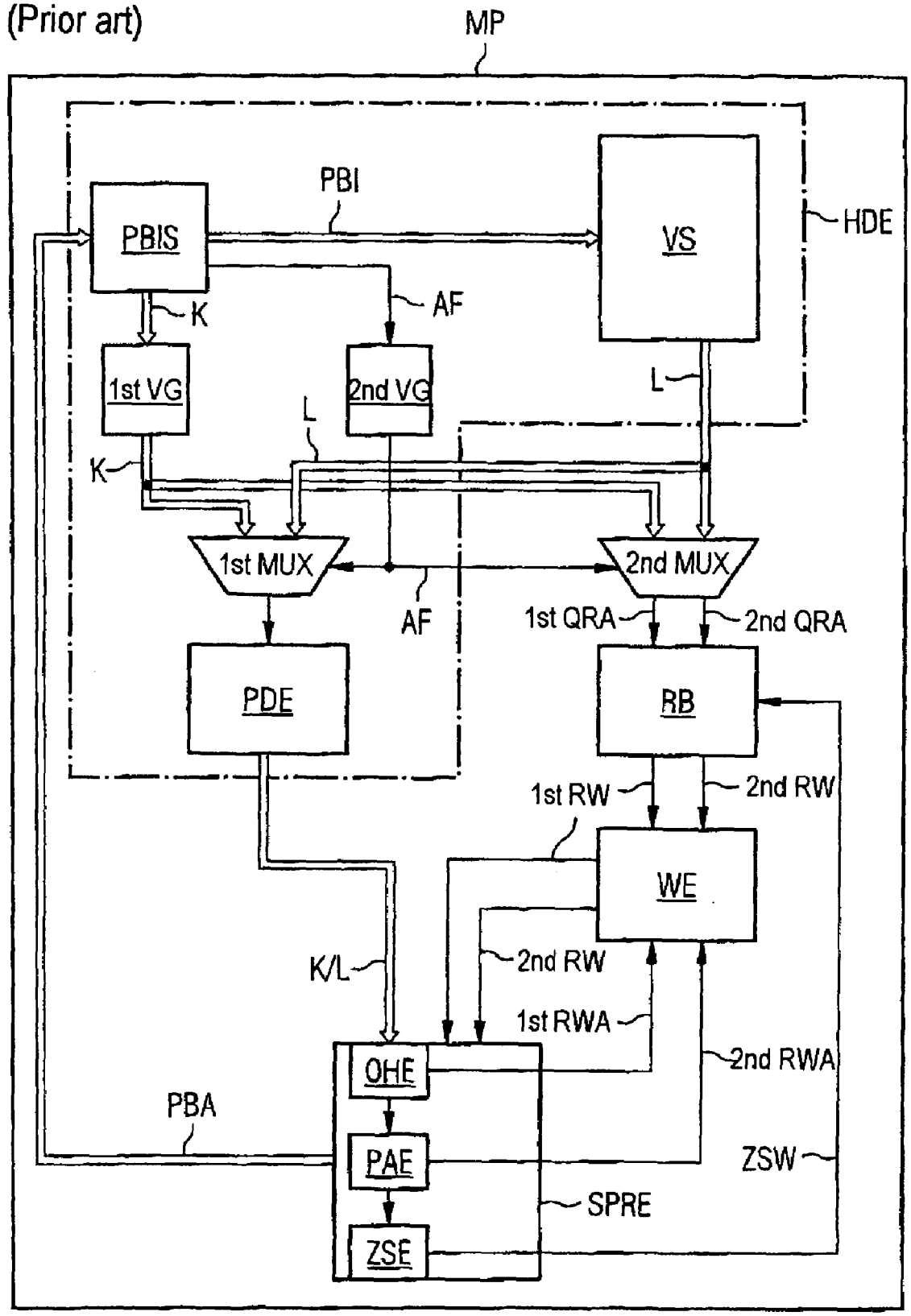
FIG. 6 shows a known microprocessor in which the known program instruction index memory for the extended storage of program instruction indices and short program instructions is used, FIGS. 7a-7c respectively show an inventive program instruction memory line which can store an inventive program instruction memory format.
Figure 7A:
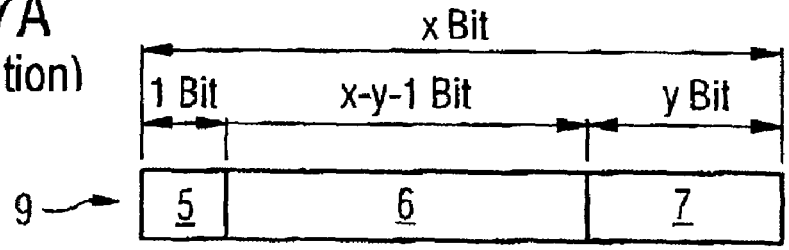
Figure 7B:
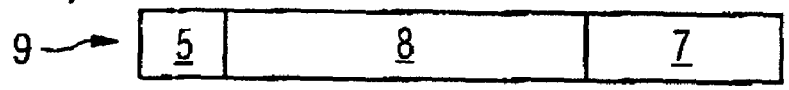
Figure 7C:
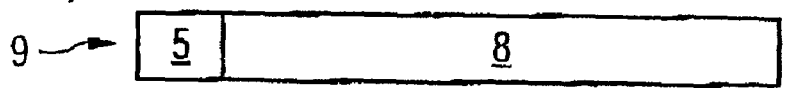

FIGS. 7a to 7c respectively show an inventive program instruction memory line 9 which can store an inventive program instruction memory format.

FIG. 7a shows that a program instruction memory line 9 stores an indicator flag 5 indicating whether the associated program instruction memory line 9 stores a long program instruction index 6 or a short program instruction 8, a long program instruction index 6 and a first source register address 7, associated with the long program instruction index 6, for addressing a first physical register value 23 (not shown).

The indicator flag 5 is stored within the program instruction memory line 9 using one bit.

In addition, FIG. 7a shows that the first source register address 7 is stored within the program instruction memory line 9 using precisely y bits, which means that the long program instruction index has precisely x-y-1 bits which addresses either the long program instruction 11 (not shown), or the long program instruction 11 and additionally the second source register address 12 (not shown) associated with the long program instruction 11.

FIG. 7b shows a second option for the inventive program instruction memory format which can be stored within the program instruction memory line 9.

In accordance with FIG. 7b, the program instruction memory line 9 stores an indicator flag 5, a short program instruction 8 and a first source register address 7 associated with the short program instruction 8.

FIG. 7c shows a third inventive program instruction memory format which can be stored within the program instruction memory line 9.

In accordance with FIG. 7c, the program instruction memory line 9 stores an indicator flag 5 and a short program instruction 8 which does not access a first source register address 7.

Figure 8:
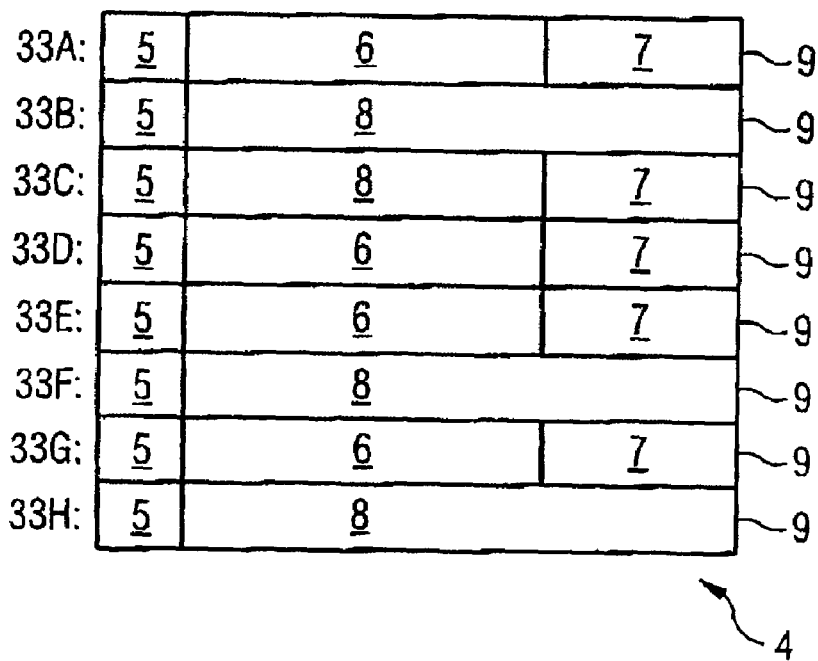
FIG. 8 shows an inventive program instruction memory for long program instruction indices and short program instructions from a power-saving fetch and decoding unit.

FIG. 8 shows an inventive program instruction memory 4 for program instruction indices 8 and short program instructions 6 from a power-saving fetch and decoding unit 2.

The program instruction memory 4 stores, in coded form, an exemplary sequence of program instructions which have been put into order using the program instruction addresses 33, 33A-33H.

A program instruction is either a short program instruction 8 and a first source register address 7 associated with the short program instruction 8 (cf. program instruction address 33C) or a short program instruction 8 (cf. program instruction address 33B) or a long program instruction 11 (not shown), indexed by the long program instruction index 6 (cf. program instruction address 33A), and a first source register address 7 associated with the long program instruction 11, or the long program instruction 11, the first source register address 7 associated with the long program instruction 11 and a second source register address 12 (not shown) associated with the long program instruction 11, the second source register address 12 likewise being indexed by the long program instruction index 6.

The indicator flag 5 in each program instruction memory line 9 specifies whether the corresponding program instruction memory line 9 stores either a short program instruction 8 or a long program instruction index 6.

Figure 9:
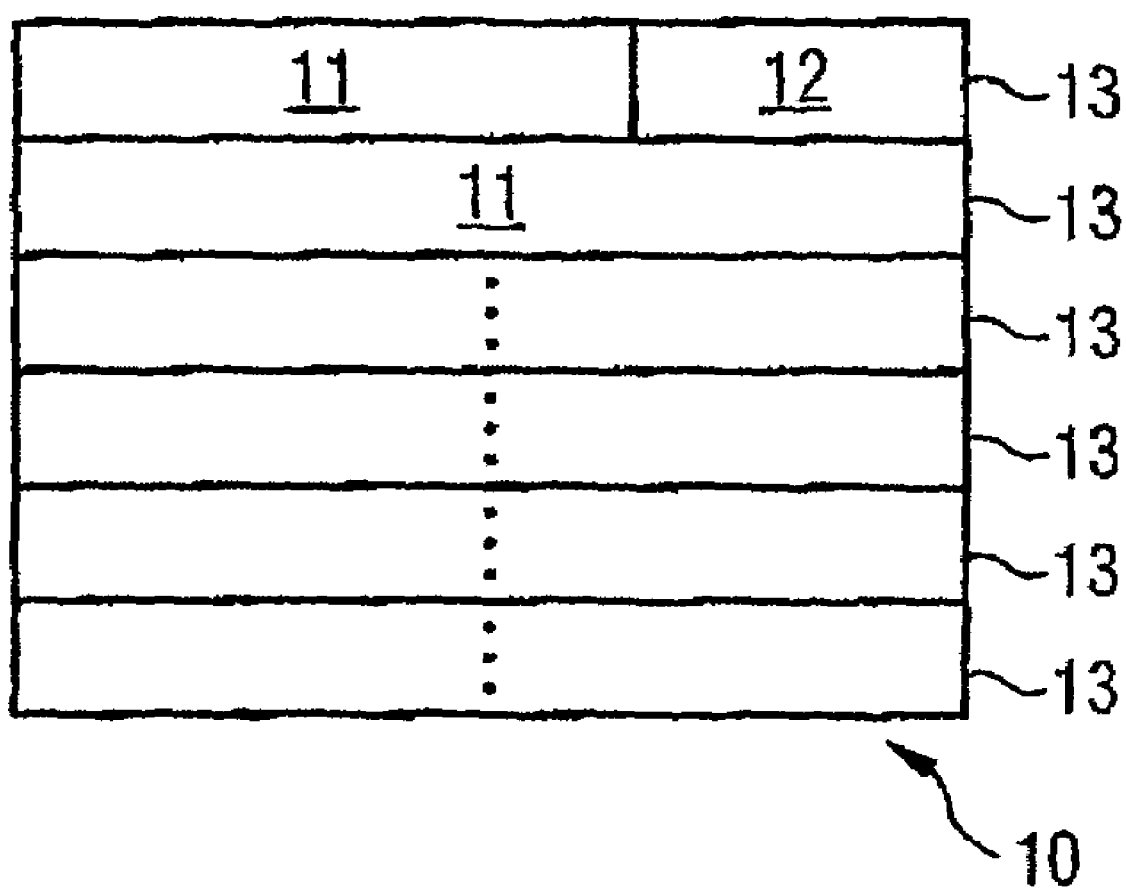
FIG. 9 shows an inventive directory memory for long program instructions from a power-saving fetch and decoding unit.

FIG. 9 shows an inventive directory memory 10 for long program instructions 11 and for the second source register address 12, associated with the long program instruction 11, of a power-saving fetch and decoding unit 2 (not shown).

The directory memory 10 for long program instructions 11 which receives the long program instruction index 6 (not shown) under the control of the indicator flag 5 (not shown) has at least one directory memory line 13.

The received long program instruction index 6 addresses the next directory memory line 13 which is to be read from the directory memory 10.

Each directory memory line 13 respectively stores either a long program instruction 11 or a long program instruction 11 and additionally second source register address 12, associated with the long program instruction 11, for addressing a second physical register value 24 (not shown).

Figure 10:
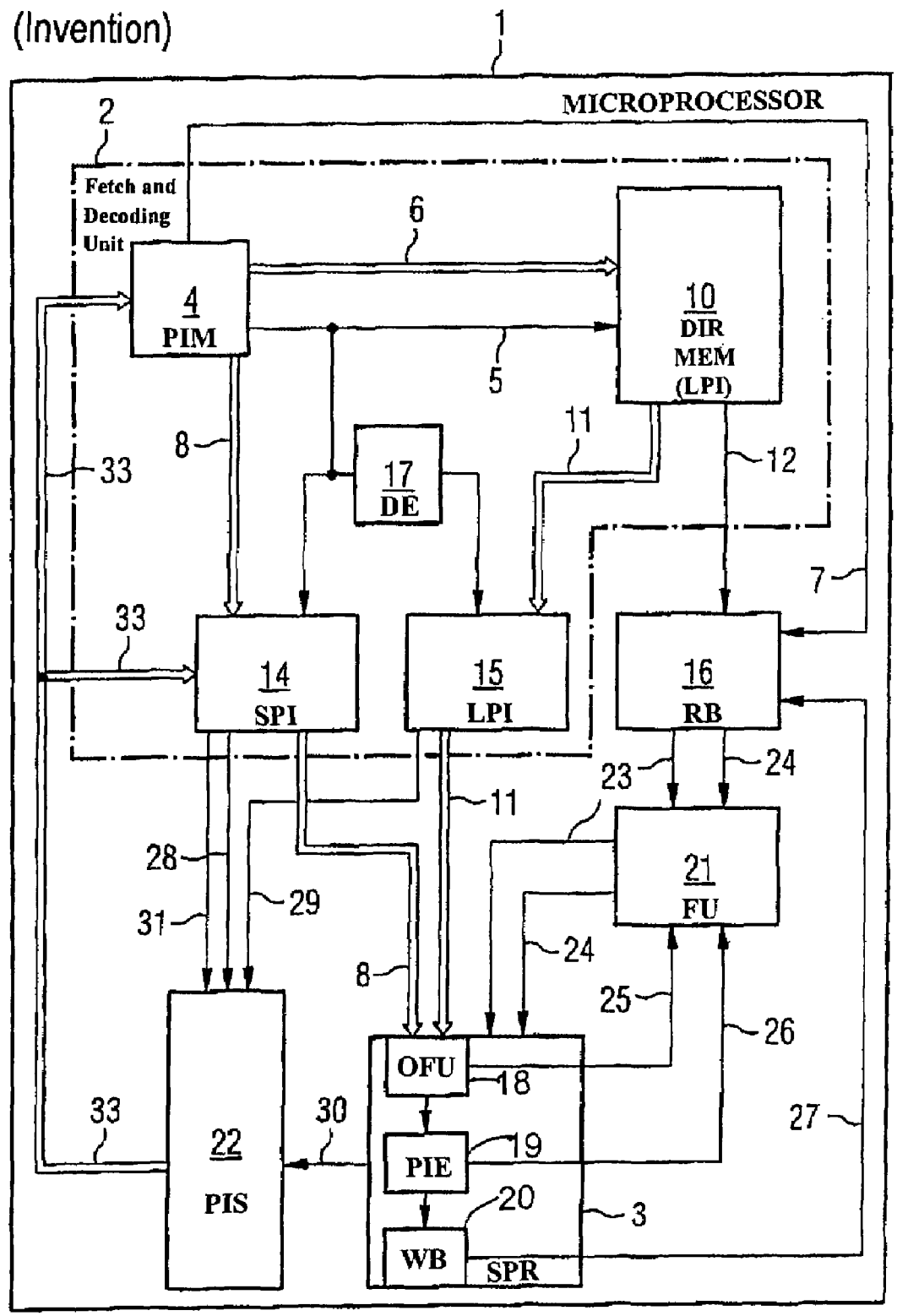
FIG. 10 shows an exemplary embodiment of an inventive microprocessor having a power-saving fetch and decoding unit and an inventive program instruction sequencer.

FIG. 10 shows a preferred exemplary embodiment of the inventive microprocessor 1 having a power-saving fetch and decoding unit 2 and a program instruction sequencer 22.

The microprocessor 1 has a power-saving fetch and decoding unit 2 for fetching and decoding program instructions.

The fetch and decoding unit 2 has a program instruction memory 4 which receives from the program instruction sequencer 22 a sequential program instruction address 33 addressing the next program instruction memory line 9 which is to be read. The program instruction memory 4 has at least one program instruction memory line 9. The program instruction memory 4 is organized on the basis of FIGS. 7a to 7c and FIG. 8.

In addition, the fetch and decoding unit 2 has a directory memory 10 for long program instructions 11. The directory memory 10 receives the long program instruction index 6 addressing the next directory memory line 13 which is to be read. The directory memory 10 has at least one directory memory line 13. The directory memory 10 is organized on the basis of FIG. 9.

The fetch and decoding unit 2 also has a short program instruction decoding unit 14 for decoding the short program instruction 8 which has been read from the program instruction memory and for providing the first program instruction counter 28 and the standard program instruction counter 31. The short program instruction decoding unit 14 can be controlled using the indicator flag 5.

In addition, the fetch and decoding unit 2 has the long program instruction decoding unit 15 for decoding the long program instruction 11 which has been read from the directory memory 10 and for providing the second program instruction counter 29. The long program instruction decoding unit 15 can be controlled using the indicator flag 5.

The fetch and decoding unit 2 also has a delay element 17 which respectively delays the indicator flag 5 by one clock cycle T in order to control the long program instruction decoding unit 15 using the indicator flag 5 delayed by one clock cycle T such that the long program instruction decoding unit 15 respectively decodes the long program instruction 11 which has been read from the directory memory 10 on a clock-cycle-sensitive basis.

The microprocessor 1 has a register bank 16 which loads precisely one first source register address 7 from the program instruction memory 4 in each clock cycle T.

If a short program instruction 8 is in that program instruction memory line 9 of the program instruction memory 4 which is to be read for the corresponding clock cycle T, then this short program instruction 8 is transferred from the program instruction memory 4 to the short program decoding unit 14, with the register bank 16 loading the first source register address 7 associated with the short program instruction 8 in the same clock cycle T.

If the long program instruction 11 which is addressed using the long program instruction index 6 and which is ascertained by the directory memory 10 is transferred from the directory memory 10 to the long program instruction decoding unit 15, then the register bank 16 loads the second source register address 12 associated with the long program instruction 11 in the same clock cycle T. The indicator flag 5 controls the directory memory 10 in each clock cycle T such that the directory memory 10 evaluates the long program instruction index 6 and the first source register address 7 associated with the long program instruction index 6 if the long program instruction index 6 is stored in the program instruction memory line 9 which is to be read for the corresponding clock cycle T.

In each clock cycle T, the register bank 16 provides the first physical register value 23, which is addressed by the first source register address 7, and the second physical register value 24 if the second physical register value 24 has been addressed by the second source register address 12 in the corresponding clock cycle T.

In addition, the microprocessor 1 has a forwarding unit 21. In each clock cycle T, the forwarding unit 21 receives and buffer-stores the register value data 34, namely the first physical register value 23 and the second physical register value 24, if the second physical register value 24 has been provided by the register bank 16, from the register bank 16, a first register value request 25 from the operand fetch unit 18 and a second register value request 26 from the program instruction execution unit 19.

The forwarding unit 21 is a logic data processing unit which takes the received register value data 34 as a basis for deciding what buffer-stored register values are forwarded as first architectonic register value 23' and as second architectonic register value 24' to the standard processor root unit 3 which is provided in the microprocessor 1.

The standard processor root unit 3 receives the decoded short instructions 8 and the decoded short instructions 11, and also the first physical register value 23' and the second physical register value 24'.

The standard processor root unit 3 has an operand fetch unit 8 for fetching operands, the architectonic register values 23' and 24', in the decoded program instruction, a program instruction execution unit 19 for executing the decoded program instruction and a write-back unit 20 for writing back operation results or write-back values 27.

The standard processor root unit 3 uses a pipeline method for the purpose of sequentially processing the program instructions which are passed to it either by the short instruction decoding unit 14 or by the long instruction decoding unit 15.

The program instruction sequencer 22 receives the first program instruction counter 28 provided by the short program instruction decoding unit 14, a standard program instruction counter 31 provided by the short program instruction decoding unit 14, the second program instruction counter 29 provided by the long program instruction decoding unit 15, optionally at least one third program instruction counter 30 provided by the standard processor root unit 3.

The program instruction sequencer 22 controls the program instruction memory 4 using the sequential program instruction address 33 generated from the program instruction sequencer inputs 35 (comprising 28-31) such that that program instruction memory line 9 of the next program instruction to be read which is addressed by the sequential program instruction address 33 is read in the subsequent clock cycle T+1.

The sequential program instruction address 33 is transferred from the program instruction sequencer 22 to the short program instruction decoding unit 14 in order to specify whether and, if positive, what skip in the program instruction address is made within the program instruction memory 4.

The first program instruction counter 28, the second program instruction counter 29 and the third program instruction counter 30 respectively specify a skip destination address for the program instruction memory 4 upon activation using a skip program instruction (branch). The standard program instruction counter 31 corresponds to the conventional instruction counter (program counter) based on the prior art.

The program instruction sequencer 22 prioritizes the second program instruction counter 29 with respect to the first program instruction counter 28 when the sequential program instruction address 33 is generated.

In addition, the program instruction sequencer 22 prioritizes the first program instruction counter 28 and the second program instruction counter 29 with respect to the third program instruction counter 30 and the standard program instruction counter 31 when the sequential program instruction address 33 is generated.

FIG. 11 shows a pipeline diagram of the inventive microprocessor having the power-saving fetch and decoding unit and having the program instruction sequencer.

In clock cycle T4, the long program instruction LPB-2 is decoded by the long program instruction decoding unit 15. Similarly, the short program instruction KPB-3 is decoded by the short program instruction decoding unit 14 in clock cycle T4.

The pipeline diagram shown in FIG. 11 shows, in particular, that two different program instructions, namely the long program instruction LPB-2 and the short program instruction KPB-3, can be decoded in one clock cycle (on the basis of the example in clock cycle T4).

Although the present invention has been described above with reference to preferred exemplary embodiments, it is not limited thereto but rather may be modified in a wide variety of ways.

| List of reference symbols | |
|---|---|
| 1 | Microprocessor |
| 2 | Fetch and decoding unit |
| 3 | Standard processor root unit |
| 4 | Program instruction memory for long program instruction indices and short program instructions |
| 5 | Indicator flag |
| 6 | Long program instruction index |
| 7 | First source register address |
| 8 | Short program instruction |
| 9 | Program instruction memory line |
| 10 | Directory memory for long program instructions |
| 11 | Long program instruction |
| 12 | Second source register address |
| 13 | Directory memory line |
| 14 | Short program instruction decoding unit |
| 15 | Long program instruction decoding unit |
| 16 | Register bank |
| 17 | Delay element |
| 18 | Operand fetch unit |
| 19 | Program instruction execution unit |
| 20 | Write-back unit |
| 21 | Forwarding unit |
| 22 | Program instruction sequencer |
| 23 | First physical register value |
| 24 | Second physical register value |
| 23' | First architectonic register value |
| 24' | Second architectonic register value |
| 25 | First register value request |
| 26 | Second register value request |
| 27 | Write-back value |
| 28 | First program instruction counter |
| 29 | Second program instruction counter |
| 30 | Third program instruction counter |
| 31 | Standard program instruction counter |
| 32 | |
| 33 | Sequential program instruction address |
| 34 | Register value data |
| 35 | Program instruction sequencer inputs |
| T | Clock cycle |

-continued

List of reference symbols

| | |
|---|---|
| T + 1 | Next clock cycle |
| MP | Microprocessor |
| PHE | Program instruction fetch unit |
| SPRE | Standard processor root unit |
| PBS | Program instruction memory |
| AF | Indicator flag |
| PBI | Program instruction index |
| 1st QRA | First source register address |
| K | Short program instruction |
| PBSZ | Program instruction memory line |
| VZ | Directory memory |
| L | Long program instruction |
| 2nd QRA | Second source register address |
| VSZ | Directory memory line |
| RB | Register bank |
| 1st VG | First delay element |
| 2nd VG | Second delay element |
| OHE | Operand fetch unit |
| PAE | Program instruction execution unit |
| ZSE | Write-back unit |
| WE | Forwarding unit |
| 1st RW | First register value |
| 2nd RW | Second register value |
| 1st RWA | First register value request |
| 2nd RWA | Second register value request |
| ZSW | Write-back value |
| PBA | Sequential program instruction address |
| PB | Program instruction |
| PBIS | Program instruction index memory |
| PBISZ | Program instruction index memory line |
| PDE | Program instruction decoding unit |

The invention claimed is:

1. Microprocessor having:
   (a) a program instruction memory which receives a sequential program instruction address addressing the next program instruction memory line which is to be read, having at least one program instruction memory line which can store an indicator flag, a long program instruction index, a short program instruction and a first source register address,
   (b) a directory memory for long program instructions which receives the long program instruction index addressing the next directory memory line which is to be read, having at least one directory memory line which can store a long program instruction and a second source register address,
   (c) a short program instruction decoding unit for decoding the short program instruction which has been read from the program instruction memory and for providing a first program instruction counter,
   (d) a long program instruction decoding unit for decoding the long program instruction which has been read from the directory memory and for providing a second program instruction counter, and having
   (e) a program instruction sequencer which generates the sequential program instruction address on the basis of the first program instruction counter and the second program instruction counter.

2. Microprocessor according to claim 1, wherein the microprocessor has a power-saving fetch and decoding unit for fetching and decoding program instructions which are processed using a standard processor root unit, where the fetch and decoding unit has:
   (a) the program instruction memory for long program instruction indices and short program instructions which receives a sequential program instruction address, having at least one program instruction memory line, where the sequential program instruction address addresses the next program instruction memory line which is to be read from the program instruction memory, where each program instruction memory line can respectively store either an indicator flag indicating whether the associated program instruction memory line stores a long program instruction index or a short program instruction, a long program instruction index and a first source register address, associated with the long program instruction index, for addressing a first physical register value or an indicator flag, a short program instruction and a first source register address associated with the short program instruction or an indicator flag and a short program instruction,
   (b) the directory memory for long program instructions, which receives the long program instruction index under the control of the indicator flag, having at least one directory memory line, where the received long program instruction index addresses the next directory memory line which is to be read from the directory memory, where each directory memory line can respectively store either a long program instruction or a long program instruction and additionally a second source register address, associated with the long program instruction, for addressing a second physical register value,
   (c) the short program instruction decoding unit, which can be controlled using the indicator flag, for decoding the short program instruction which has been read from the program instruction memory and for providing the first program instruction counter, and
   (d) the long program instruction decoding unit, which can be controlled using the indicator flag, for decoding the long program instruction which has been read from the directory memory and for providing the second program instruction counter.

3. Microprocessor according to claim 2, wherein the program instruction memory stores, in coded form, a sequence of program instructions which has been put into order using the sequential program instruction addresses, where a program instruction is either a short program instruction and a first source register address associated with the short program instruction or a short program instruction or a long program instruction and a first source register address associated with the long program instruction or the long program instruction, the first source register address associated with the long program instruction and a second source register address associated with the long program instruction, and where precisely one program instruction memory line of the program instruction memory read for each clock cycle.

4. Microprocessor according to claim 1, wherein the program instruction memory line of the program instruction memory has a predetermined number of x bits, where the indicator flag is stored using precisely one bit, and the remaining x-1 bits are used for storing either the long program instruction index and the first source register address associated with the long program instruction index or the short program instruction or the short program instruction and the first source register address associated with the short program instruction.

5. Microprocessor according to claim 1, wherein the first source register address within the program instruction memory line of the program instruction memory can be stored using precisely y bits, which means that the long program instruction index has precisely x-y-1 bits, which addresses either the long program instruction or the long program instruction and additionally the second source register address associated with the long program instruction.

6. Microprocessor according to claim 1, wherein the short program instruction is a program instruction which accesses no more than the first source register address associated with the short program instruction and has no more than x-1 bits.

7. Microprocessor according to claim 1, wherein the microprocessor has a register bank which loads precisely one first source register address from the program instruction memory in each clock cycle.

8. Microprocessor according to claim 1, wherein the long program instruction index, if stored in that program instruction memory line of the program instruction memory which is to be read for the corresponding clock cycle, is transferred from the program instruction memory to the directory memory, with the directory memory ascertaining the directory memory line which is associated with the long program instruction index.

9. Microprocessor according to claim 1, wherein the short program instruction, if stored in that program instruction memory line of the program instruction memory which is to be read for the corresponding clock cycle, is transferred from the program instruction memory to the short program instruction decoding unit, with the register bank loading the first source register address associated with the short program instruction in the same clock cycle.

10. Microprocessor according to claim 1, wherein the long program instruction which is addressed using the long program instruction index and is ascertained by the directory memory transferred from the directory memory to the long program instruction decoding unit, with the register bank loading the second source register address associated with the long program instruction in the same clock cycle.

11. Microprocessor according to claim 1, wherein the indicator flag in each program instruction memory line indicates whether the corresponding program instruction memory line stores either a short program instruction or a long program instruction index.

12. Microprocessor according to claim 1, wherein a short program instruction is stored in the corresponding program instruction memory line if the indicator flag in the corresponding program instruction memory line has been set to zero.

13. Microprocessor according to claim 1, wherein a long program instruction index and a first source register address associated with the long program instruction index are stored in the corresponding program instruction memory line if the indicator flag in the corresponding program instruction memory line has been set to one.

14. Microprocessor according to claim 1, wherein the indicator flag controls the directory memory in each clock cycle such that if the long program instruction index is stored in the program instruction memory line which is to be read for the corresponding clock cycle the directory memory evaluates the long program instruction index and the first source register address associated with the long program instruction index.

15. Microprocessor according to claim 1, wherein the fetch and decoding unit has a delay element which respectively delays the indicator flag by one clock cycle in order to control the long program instruction decoding unit using the indicator flag delayed by one clock cycle such that the long program instruction decoding unit respectively decodes the long program instruction which has been read from the directory memory on a clock-cycle-sensitive basis.

16. Microprocessor according to claim 1, wherein the standard processor root unit has an operand fetch unit for fetching operands in the decoded program instruction, a program instruction execution unit for executing the decoded program instruction, and a write-back unit for writing back operation results.

17. Microprocessor according to claim 1, wherein in each clock cycle the register bank provides the first physical register value, which has been addressed by the first source register address, and the second physical register value if the second physical register value has been addressed by the second source register address in the corresponding clock cycle.

18. Microprocessor according to claim 1, wherein the microprocessor has a forwarding unit which, in each clock cycle, receives register value data, namely the first physical register value and the second physical register value if the second physical register value has been provided by the register bank, from the register bank, a first register value request from the operand fetch unit and a second register value request from the program instruction execution unit, and buffer-stores them.

19. Microprocessor according to claim 1, wherein the forwarding unit is a logic data processing unit which takes the received register value data as a basis for deciding what buffer-stored register values are forwarded to the standard processor root unit as first architectonic register value and as second architectonic register value.

20. Microprocessor according to claim 1, wherein the program instruction sequencer has program instruction sequencer inputs, namely the first program instruction counter provided by the short program instruction decoding unit, a standard program instruction counter provided by the short program instruction decoding unit, the second program instruction counter provided by the long program instruction decoding unit, optionally at least one third program instruction counter provided by the standard processor root unit, with the program instruction sequencer controlling the program instruction memory using the sequential program instruction address generated from the program instruction sequencer inputs such that that program instruction memory line in the next program instruction to be read which is addressed by the sequential program instruction address is read in the subsequent clock cycle.

21. Microprocessor according to claim 1, wherein the sequential program instruction address is transferred from the program instruction sequencer to the short program instruction decoding unit in order to specify whether and, if positive, what skip in the program instruction address is made within the program instruction memory.

22. Microprocessor according to claim 1, wherein the first program instruction counter, the second program instruction counter and the third program instruction counter respectively specify a skip destination address for the program instruction memory by activating a skip program instruction.

23. Microprocessor according to claim 1, wherein the program instruction sequencer prioritizes the second program instruction counter with respect to the first program instruction counter when the sequential program instruction address is generated.

24. Microprocessor according to claim 1, wherein the program instruction sequencer prioritizes the first program instruction counter and the second program instruction counter with respect to the third program instruction counter and the standard program instruction counter when the sequential program instruction address is generated.

25. Microprocessor according to claim 1, wherein the standard processor root unit uses a pipeline method for the purpose of sequentially processing the program instructions which are passed to it either by the short instruction decoding unit or by the long instruction decoding unit.

26. Microprocessor according to claim 1, wherein the standard processor root unit is part of a DSP processor, of a protocol processor or of a universal processor (general purpose processor).

27. Microprocessor according to claim 1, wherein the program instruction execution unit in the standard processor root unit contains an arithmetic and logic unit and/or an address generator unit.

28. Method for fetching and decoding program instructions in power-saving fashion using a microprocessor, where the fetched and decoded program instructions are processed using a standard processor root unit, having the following steps:

(a) receiving a sequential program instruction address using a program instruction memory for long program instruction indices and short program instructions, where the program instruction memory has at least one program instruction memory line, where the sequential program instruction address addresses the next program instruction memory line which is to be read from the program instruction memory, where each program instruction memory line can respectively store either an indicator flag indicating whether the associated program instruction memory line stores a long program instruction index or a short program instruction, a long program instruction index and a first source register address, associated with the long program instruction index, for addressing a first register value or an indicator flag, a short program instruction and a first source register address associated with the short program instruction or an indicator flag and a short program instruction, (b) receiving the long program instruction index using a directory memory for long program instructions which is controlled by the indicator flag, where the directory memory has at least one directory memory line, where the received long program instruction index addresses the next directory memory line which is to be read from the directory memory, where each directory memory line can respectively store either a long program instruction or a long program instruction and additionally a second source register address, associated with the long program instruction, for addressing the second register value, (c) decoding the short program instruction which has been read from the program instruction memory using a short program instruction decoding unit, (d) decoding the long program instruction which has been read from the directory memory using a long program instruction decoding unit, and (e) generating the sequential program instruction address and using the program instruction sequencer on the basis of the first program instruction counter and the second program instruction counter.

* * * * *